United States Patent [19]
Dittenhöfer

[11] Patent Number: 5,639,166
[45] Date of Patent: Jun. 17, 1997

[54] THREE-RACE BEARING

[75] Inventor: Thomas Dittenhöfer, Dittelbrunn, Germany

[73] Assignee: SKF GmbH, Postfach, Germany

[21] Appl. No.: 495,089

[22] Filed: Jun. 27, 1995

[30] Foreign Application Priority Data

Jun. 29, 1994 [DE] Germany ................. 94105 U

[51] Int. Cl.⁶ ................. F16C 19/55; F16C 19/54
[52] U.S. Cl. ................. 384/461; 384/454
[58] Field of Search ................. 384/461, 452, 384/453, 454, 455

[56] References Cited

U.S. PATENT DOCUMENTS

| | | | |
|---|---|---|---|
| 2,518,159 | 8/1950 | Martin | 384/461 |
| 2,819,127 | 1/1958 | Grobey | 384/461 |
| 3,476,453 | 11/1969 | Kastner | 384/454 |
| 4,533,263 | 8/1985 | McGuffie | 384/454 |
| 5,234,270 | 8/1993 | Mathes | 384/461 |

FOREIGN PATENT DOCUMENTS

| | | | |
|---|---|---|---|
| 3912449C2 | 1/1992 | Germany. | |
| 438382 | 7/1949 | Italy | 384/461 |

*Primary Examiner*—Thomas R. Hannon
*Attorney, Agent, or Firm*—Ostrolenk, Faber, Gerb & Soffen, L.L.P.

[57] ABSTRACT

A three-race bearing for rolls or pressure rollers having inner and outer races and a common center race forming an outer roller bearing which is exclusively a radial bearing and the inner roller bearing which is exclusively an axial guiding rolling bearing.

8 Claims, 1 Drawing Sheet

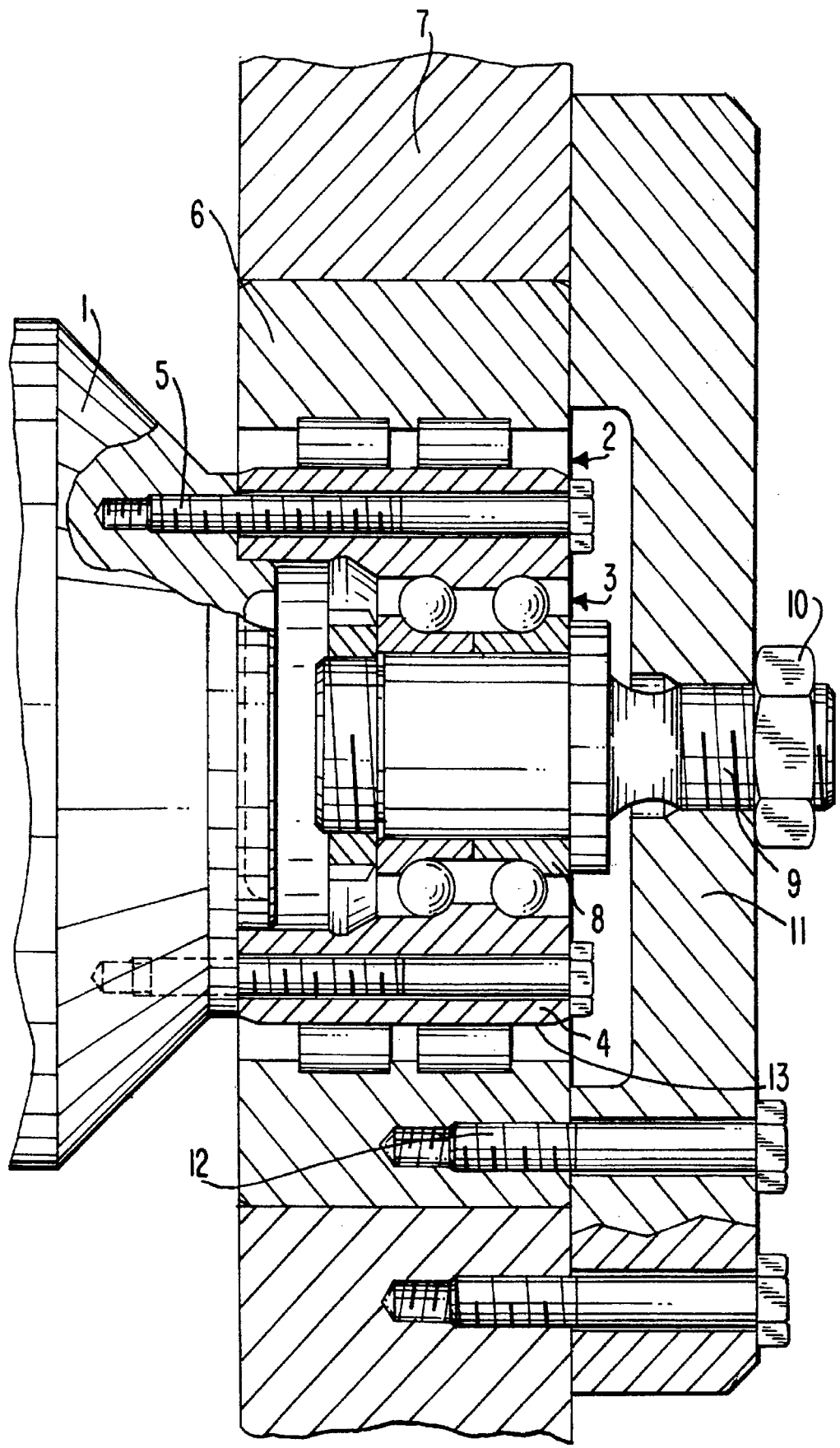

THREE-RACE BEARING

BACKGROUND OF THE INVENTION

The invention concerns a three-race bearing for rolls or pressure rolls having inner and outer races and a common center race. A bearing having these elements is already disclosed in DE 3,912,449. Double-row tapered roller bearings are used for the inner as well as for the outer rolling bearings. All four rows of rollers carry both the radial load on one hand and provide axial guidance on the other hand. A uniform load distribution can be obtained only at great expense. In addition, the manufacturing expenditure is very high in tapered roller bearings of this design.

The object of the invention is to provide a three-race bearing of the type mentioned above, which can be produced inexpensively and has a separate load allocation.

SUMMARY OF THE INVENTION

This object is accomplished in that the outer rolling bearing is designed as an exclusively radial cylindrical roller bearing and the inner rolling bearing is designed as an exclusively axial rolling bearing.

The invention is described below by the example represented in the drawing.

BRIEF DESCRIPTION OF THE DRAWINGS

FIG. 1 is a longitudinal sectional view of a three-race bearing.

DETAILED DESCRIPTION OF THE PREFERRED EMBODIMENT

The single figure shows the longitudinal section of a three-race bearing for a roll or cylinder 1 with separate allocation of radial loading and axial guidance. There a double-row cylindrical roller bearing 2, lying radially outside, that assumes the entire radial loading and a double-row angular contact ball bearing 3, in O arrangement and lying radially inside, that provides axial guidance. The two bearings 2, 3 have a common middle race 4, which is fastened to the roll 1 with threaded bolts 5. The outer race 6 is inserted in a frame 7 or the like, not illustrated in detail. The angular contact ball bearing 3 is provided with two inner races 8, which are mounted on a single axle or shaft 9 and secured by means of a nut 10. The axle bolt 9 itself is inserted in a strong cover disk 11 and bolted adjustably. Disk 11 extends radially across the outer race 6 and is fastened thereto by bolts 12. The angular contact ball bearing 3 is thereby centered and obtains a fixed axial position with respect to the outer race 6 and/or the frame 7. The separate mounting of the inner races 8 and the O arrangement of the angular contact ball bearing 3 make it possible to set a precisely defined axial position or guidance or to provide the same in the modular unit upon manufacture. The inner raceway 13 of the cylindrical roller bearing 2 on the center race 4 is manufactured with no axial shoulder. In this way the cylindrical roller bearing 2 is able to position itself axially and is completely free of axial forces.

I claim:

1. A three-race bearing for rolls or pressure rollers having outer and inner races and a common center race secured between said outer and inner races forming outer and inner roller bearings respectively, said three-race bearing operable with a frame, the improvement wherein said outer roller bearing is exclusively a radial roller bearing, said inner roller bearing is exclusively an axial roller bearing, said three-race bearing further comprising an axle pin extending from said frame and through the bore of the inner race of the inner roller bearing, the inner race of the inner roller bearing being connected concentrically with the outer race of the outer roller bearing by said axle pin.

2. A three-race bearing according to claim 1, characterized in that the axle pin is axially adjustable with respect to the cover plate by a threaded coupling.

3. A three-race bearing according to claim 1, wherein said outer race of said roller bearing has opposite ends, the three-race bearing further comprising a cover plate axially adjacent one of said opposite ends, first means for securing said cover plate to said frame, second means for securing said axle pin to said cover plate, and third means for securing said axle pin to said inner race of said inner roller bearing.

4. A three-race bearing according to claim 3, characterized in that the axle pin is axially adjusted with respect to the cover plate by a threaded coupling.

5. A three-race bearing according to claim 3, characterized in that the center race has opposite axial ends and circumferentially spaced axial threaded bores therein, and said cover has similarly spaced axial bores for receiving therethrough said second means.

6. A three-race bearing according to claim 5 wherein said second means comprises threaded bolts, and said bores in said outer race have mating threads to said bolts.

7. A three-race bearing for rolls or pressure rollers having outer and inner races and a common center race secured between said outer and inner races forming outer and inner roller bearings respectively, said three-race bearing operable with a frame, the improvement wherein said outer roller bearing is exclusively a radial roller bearing, said inner roller bearing is exclusively an axial roller bearing, said outer roller bearing has cylindrical rollers with axial play for compensating for manufacturing and assembly tolerances, said three-race bearing further comprising a shaft extending from said frame and through the bore of the inner race of the inner roller bearing, the inner race of the inner roller bearing being connected concentrically with the outer race of the outer roller bearing by said shaft.

8. A three-race bearing for rolls or pressure rollers having outer and inner races and a common center race secured between said outer and inner races forming outer and inner roller bearings respectively, said three-race bearing operable with a frame, the improvement wherein (a) said outer roller bearing is exclusively a radial roller bearing, (b) the inner roller bearing is exclusively an axial roller bearing, (c) said outer roller bearing has two axially spaced rows of cylindrical rollers, (d) and the inner roller bearing comprises a double-row angular contact ball bearings with a divided inner race, and said three-race bearing further comprises a shaft extending from said frame and through the bore of the inner race of the inner roller bearing, the inner race of the inner roller bearing being connected concentrically with the outer race of the outer roller bearing by said shaft.

* * * * *